UNITED STATES PATENT OFFICE.

JOHN URI LLOYD, OF CINCINNATI, OHIO.

PROCESS OF EXTRACTING, PURIFYING, OR EXCLUDING ALKALOIDS AND ALKALOIDAL SALTS.

1,300,747. Specification of Letters Patent. Patented Apr. 15, 1919.

No Drawing. Application filed July 6, 1915. Serial No. 38,316.

*To all whom it may concern:*

Be it known that I, JOHN URI LLOYD, a citizen of the United States of America, and resident of Cincinnati, county of Hamilton, and State of Ohio, have invented certain new and useful Improvements in Processes of Extracting, Purifying, or Excluding Alkaloids and Alkaloidal Salts, of which the following is a specification.

My invention relates to a process for separating alkaloids and alkaloidal substances from mixtures in which they may be found in nature.

The object of my invention is a process of doing this, which is simpler and less expensive than processes that have been used commonly in the art by others prior to my invention.

I have discovered that certain insoluble clays or compounds of magnesium, when placed in aqueous, or acidulated solutions of alkaloids and alkaloidal salts will precipitate them from solution, and that said insoluble compounds when mixed with said soluble compounds before placing them in the liquids will prevent the said soluble compounds from going into solution.

The insoluble compound of magnesium is magnesium silicate, preferably hydrous magnesium or a form of aluminum silicate containing magnesium.

The alkaloids which may thus be precipitated include quinin, cocain, nicotin, strychnin and emetin.

My process affords a means for obtaining alkaloids and alkaloidal salts from mixtures thereof with various ingredients, which is much simpler and cheaper than methods commonly in use prior to my invention.

An example of my process is as follows:

To a solution of one half pint of water and one half grain of strychnin sulfate add one gram of hydrous magnesium silicate, shake the mixture well and filter. The one half grain of strychnin and the one gram of magnesium silicate will be retained upon the filter.

The strychnin may be separated from the hydrous magnesium silicate as follows: Place the filtrate in chloroform or alcohol which has been made alkaline in character. This will dissolve the strychnin, leaving the hydrous magnesium silicate undissolved. Remove the hydrous magnesium silicate by filtration. Evaporate the volatile solvent, and the strychnin will be left in a crystalline or colloidal form.

What I claim is:

1. A process of precipitating an alkaloidal substance from a neutral or slightly acid solution by an insoluble magnesium compound in pulverulent form.

2. A process of precipitating an alkaloidal substance from a neutral or slightly acid solution by an insoluble compound of magnesium and silica in pulverulent form.

3. A process of precipitating an alkaloidal substance from a neutral or slightly acid solution by the addition thereto of hydrous magnesium silicate in a pulverulent form.

4. A process of precipitating an alkaloidal substance from a neutral or slightly acid solution by the addition thereto of magnesium clay in pulverulent condition.

In testimony whereof, I have hereunto subscribed my name this 29th day of June, 1915.

JOHN URI LLOYD.

Witnesses:
WALTER F. MURRAY,
W. THORNTON BOGERT.